US007653988B2

(12) United States Patent
Kamata et al.

(10) Patent No.: US 7,653,988 B2
(45) **Date of Patent: *Feb. 2, 2010**

(54) METHOD FOR ORDER RECEIPT PRODUCTION OF ELECTRIC WIRE AND ITS ORDER RECEIPT PRODUCTION SYSTEM

(75) Inventors: Takeshi Kamata, Shizuoka (JP); Shigeharu Suzuki, Shizuoka (JP); Keigo Sugimura, Shizuoka (JP); Kiyoshi Yagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 790 days.

This patent is subject to a terminal disclaimer.

(21) Appl. No.: 10/498,986

(22) PCT Filed: Oct. 30, 2002

(86) PCT No.: PCT/JP02/11265

§ 371 (c)(1), (2), (4) Date: Feb. 11, 2005

(87) PCT Pub. No.: WO03/058647

PCT Pub. Date: Jul. 17, 2003

(65) Prior Publication Data

US 2005/0131568 A1 Jun. 16, 2005

(30) Foreign Application Priority Data

Dec. 28, 2001 (JP) ............................ 2001-400643

(51) Int. Cl.
*G06F 19/00* (2006.01)
*H01R 43/00* (2006.01)

(52) U.S. Cl. .......................... 29/825; 29/33 M; 29/748; 174/110 R; 700/117

(58) Field of Classification Search ................. 700/117, 700/123, 95; 29/33 M, 748, 747, 825, 854, 29/857, 868; 428/378; 174/110 R, 125.1, 174/126.4; 705/26; 427/117, 118; 118/300
See application file for complete search history.

(56) References Cited

U.S. PATENT DOCUMENTS 4,347,651 A * 9/1982 Inoue et al. ................ 29/33 M
4,487,994 A * 12/1984 Bahder ...................... 174/73.1
4,833,778 A * 5/1989 Loustau ..................... 29/33 M
5,356,710 A * 10/1994 Rinehart ..................... 428/378

(Continued)

FOREIGN PATENT DOCUMENTS

DE 32 19 569 12/1983

(Continued)

*Primary Examiner*—Charles R Kasenge
(74) *Attorney, Agent, or Firm*—Kratz, Quintos & Hanson, LLP

(57) ABSTRACT

A method and a system of manufacturing electric wires by ordering, possible to save the cost and materials, is provided. A system includes an order-receiving section, a manufacturing section and a coloring/cutting section. The order-receiving section receives orders of electric wires, and outputs a first datum of amount of electric wires DT1, informing a length of a monochromatic electric wire, and outputs a second datum of amount of electric wires DT2, informing lengths for respective colors of electric wires. The manufacturing section manufactures a monochromatic electric wire according to the first datum DT1 and conveys the electric wire to the coloring/cutting section. The coloring/cutting section colors and cuts the electric wire according to the second datum DT2.

9 Claims, 4 Drawing Sheets

U.S. PATENT DOCUMENTS

| | | | | |
|---|---|---|---|---|
| 5,357,439 | A | 10/1994 | Matsuzaki et al. | |
| 5,452,517 | A * | 9/1995 | Lothmann | 33/41.4 |
| 5,594,980 | A * | 1/1997 | Tamura et al. | 29/33 M |
| 5,659,949 | A * | 8/1997 | Ohba et al. | 29/748 |
| 6,263,254 | B1 * | 7/2001 | Nishimura et al. | 700/117 |
| 6,271,474 | B1 * | 8/2001 | Fujikami et al. | 174/125.1 |
| 6,498,300 | B2 * | 12/2002 | Flick | 174/110 R |
| 6,591,153 | B2 * | 7/2003 | Crampton et al. | 700/100 |
| 6,863,752 | B1 * | 3/2005 | Han | 156/52 |
| 7,275,317 | B2 * | 10/2007 | Kamata et al. | 29/825 |
| 7,361,840 | B2 * | 4/2008 | Kamata et al. | 174/112 |
| 2005/0129855 | A1 * | 6/2005 | Kamata et al. | 427/356 |

FOREIGN PATENT DOCUMENTS

| | | | |
|---|---|---|---|
| EP | 1160939 | A1 * | 12/2001 |
| FR | 2 555 397 | | 5/1985 |
| GB | 2 272 655 | | 5/1994 |
| JP | 46-37542 | | 11/1971 |
| JP | 61-173411 | | 9/1986 |
| JP | 61-253720 | | 11/1986 |
| JP | 3-110722 | | 5/1991 |
| JP | 3125791 | | 11/1991 |
| JP | 5-217435 | | 8/1993 |
| JP | 2799925 | | 4/1994 |
| JP | 8-138465 | | 5/1996 |
| WO | WO 03019580 | A1 * | 3/2003 |
| WO | WO 03034449 | A1 * | 4/2003 |

* cited by examiner

METHOD FOR ORDER RECEIPT PRODUCTION OF ELECTRIC WIRE AND ITS ORDER RECEIPT PRODUCTION SYSTEM

BACKGROUND OF THE INVENTION

1. Field Of The Invention

This invention relates to a method of manufacturing electric wires by ordering and to a system of manufacturing electric wires by ordering to be manufactured and delivered to an orderer, the electric wire being used for a wiring harness or the like for interconnection of a car as a vehicle.

2. Description Of The Related Art

An electric wire is made by continuously coating synthetic resin on an electric conductor so that manufacturing longer wire gives better productivity and electric wires usually may be manufactured under minimizing changes of coating colors as much as possible. Thus, usually a longer electric wire is manufactured without change of a coating color. Usual shipping units are large lot sizes of long wires and are sold by piece of respective colors required by an, orderer at a warehouse of an electric wire dealer. A wire harness for interconnecting with many wire colors may be used in a car, a domestic electric product, an aircraft and an electric machine.

Many electronic apparatuses are installed in a car as a vehicle. Then, wire harnesses interconnect electronic apparatuses in the car to supply electric power from an electric power source to the electronic apparatuses and to output control signals from a computer to the electronic apparatuses. A wire harness comprises a plurality of electric wires and a connector being joined with an end of the electric wire.

An electric wire includes an electrical conductive core wire and an insulating covering for coating the core wire. The electric wire is a so-called coated electric wire. A connector is provided with a terminal and an insulating connector housing. The terminal is made of an electrical conductive metal plate or the like. The connector housing is formed into box-shape for receiving the terminal. By mating the connector with a connector in an electronic apparatus, the wire harness transmits required electric power and signals to the electronic apparatus.

Respective electric wires of the wire harness are required to be distinguishable about a size of core wire, a material of a covering (some coverings of some electric wires may require heat resistance) and a purpose of use. The purpose of use is for a control signal of an airbag, ABS (Antilock Brake System) or car speed information or for controlling a car about respective systems, such a power transmitting system.

The electric wires of the wire harness are colored variously to distinguish the purpose of use (system). An electric wire is usually made to coat a core wire with a colored synthetic resin in which a required coloring material is mixed.

Therefore, in a factory of electric wires, electric wires of all colors ordered by an orderer are manufactured respectively and cut in a predetermined length, such as 500 or 2000 meters and bundled. In the process of receiving an order to delivering required electric wires to an orderer, bundles of electric wires with requested colors are shipped from a factory of electric wires to a distribution center, and at the distribution center the bundled electric wires are cut in respectively required lengths, and are delivered to the orderer. Or, a number of bundles of electric wires to meet order amount are delivered to the orderer.

According to the usual method of manufacturing electric wires by ordering as mentioned above, electric wires are respectively cut in, for example, 500-2000 meters and are bundled at a factory of electric wires. At the factory of electric wires, many various color electric wires, which may be required by an orderer, are manufactured. Furthermore, bundles of electric wires are cut in respective lengths corresponding to amount of an order of an orderer at a distribution center. Or, a number of bundles of electric wires to meet order amount are delivered to the orderer.

When a number of bundles of electric wires to meet an order amount are delivered to the orderer, the orderer may purchase an amount of electric wires which is more than required amount. Therefore, when the orderer manufactures the above-mentioned wire harnesses or other products using the electric wires, the cost of the products may be increased. Furthermore, when the bundled electric wires are cut in respectively required lengths at the distribution center and are delivered to the orderer the remaining electric wires may exist respectively on each color at the distribution center.

Thus, according to the usual method of manufacturing electric wires by ordering as mentioned above, at least one of a distribution center and an orderer may have an amount of electric wires more than the required amount so that it is undesirable for saving materials.

Each color of the electric wires is manufactured respectively at the factory of electric wires so that a large room for storing electric wires is required at the factory of electric wires and the distribution center. Therefore, the productivity of wire harnesses is declined so that costs of products using the wire harnesses may be increased.

To overcome the above drawback of prior art, one object of the present invention is to provide a method of manufacturing electric wires by ordering and a system of manufacturing electric wires by ordering which can restrain increasing costs of products using electric wires such as wire harnesses and can save materials.

SUMMARY OF THE INVENTION

In order to attain the objects, a method of manufacturing electric wires by ordering according to the present invention, comprises the steps of manufacturing a monochromatic electric wire in a required length after receiving an order of an electric wire, coloring an outer surface of the monochromatic electric wire, cutting the electric wire in the requested length, and delivering the electric wire to an orderer.

According to the above method, after receiving an order of an electric wire, a monochromatic electric wire is manufactured in a required length. Therefore the amount (length) of the electric wire stored in advance can be restrained. Furthermore, a monochromatic electric wire is used so that a number of kinds of electric wires (color) stored in advance can be restrained.

A monochromatic electric wire is manufactured in a required length and is colored on the outer surface thereof in the requested color and is cut in the requested length and delivered to an orderer. Therefore, the amount of an electric wire stored temporarily can be restrained. The monochromatic electric wire may be colored in one color and cut in the requested length or may be colored in multi colors and cut in requested lengths for respective colors.

The method of manufacturing electric wires by ordering, as mentioned above, is further characterized in that the electric wire being manufactured in a required length after receiving an order of an electric wire is colorless.

According to the above method, an electric wire manufactured after receiving an order of an electric wire is colorless. Therefore, the colorless electric wire can be colored securely in the requested color whenever it is necessary.

"colorless", mentioned herein, means "of natural color" of synthetic resin, structuring a covering of an electric wire, in which various coloring material is not contained or not coated. The outer surface of the electric wire has the natural color of the synthetic resin.

"coloring an electric wire", mentioned herein, means "coloring outer surface of covering of the electric wire with a coloring material". The coloring material is a liquid material made by dissolving or dispersing a color substance (industrial organic material) in a water or other solvent. Dye or pigment is used as a color substance. The coloring material herein means both a coloring liquid and a color-coating material.

The coloring liquid is made by that dye is dissolved or dispersed in a solvent. The color-coating material is made by that pigment is dispersed in a fluid dispersion. When coloring the outer surface of the electric wire with a coloring liquid, the dye penetrates in the covering. When coloring the outer surface of the electric wire with a color-coating material, the pigment adheres to the outer surface without penetrating in the covering. Thus, "coloring outer surface of covering" herein means "dyeing outer surface of a covering with a dye partly or throughout" or "coating outer surface of a covering with a color-coating material partly or throughout".

The solvent and the fluid dispersion may have preferably an affinity for synthetic resin of the covering of the electric wire. Thereby, a dye can penetrate securely in the covering or a pigment can adhere securely to the outer surface of the covering.

A method of manufacturing electric wires by ordering according, to this invention, comprises the steps of manufacturing a monochromatic electric wire in a required length after receiving an order of an electric wire, coloring outer surface of the monochromatic electric wire respectively in multi colors, cutting the electric wire in requested lengths for respective colors, and delivering the electric wire to an orderer.

According to the above method, after receiving an order of an electric wire, a monochromatic electric wire is manufactured in a required length. Therefore, amount (length) of the electric wire stored in advance can be restrained. Furthermore, a monochromatic electric wire is used so that a number of kinds of electric wires (colors) stored in advance can be restrained.

A monochromatic electric wire is manufactured in a required length, and colored on the outer surface thereof in multi colors, and cut in requested lengths for respective colors, and delivered to an orderer. Therefore, amount of an electric wire stored temporarily can be restrained.

The method of manufacturing electric wires by ordering, mentioned above, is further characterized that the electric wire being manufactured in required length after receiving an order of an electric wire is colorless.

According to the above method, an electric wire manufactured after receiving an order of an electric wire is colorless. Therefore, the colorless electric wire can be colored securely in the requested color whenever it is necessary.

A system of manufacturing electric wires by ordering, according to this invention, includes an order-receiving section for receiving orders of electric wires, a manufacturing section for manufacturing electric wires, and a coloring/cutting section for coloring an electric wire in the requested color and cutting the electric wire in the requested length, the order-receiving section generating a first datum of amount of electric wires informing a required length of the electric wire according to amounts of the electric wires ordered by an orderer and outputting the first datum of amount of electric wires to the manufacturing section, the order-receiving section generating a second datum of amount of electric wires informing lengths for respective colors of the electric wires according to amounts of the electric wires ordered by an orderer and outputting the second datum of amount of electric wires to the coloring/cutting section, the manufacturing section manufacturing a monochromatic electric wire in amount corresponding to the first datum of amount of electric wires and conveying the monochromatic electric wire to the coloring/cutting section, the coloring/cutting section coloring the monochromatic electric wire and cutting the colored electric wire according to the second datum of amount of electric wires, and delivering the electric wire to the orderer.

According to the above system, after receiving an order of an electric wire, the order-receiving section outputs the first datum of amount of electric wires, informing a required length of the electric wire, to the manufacturing section, and outputs the second datum of amount of electric wires, informing lengths for respective colors of the electric wires, to the coloring/cutting section. The manufacturing section manufactures a monochromatic electric wire in a required amount and conveying the monochromatic electric wire to the coloring/cutting section. Therefore, amount (length) of the electric wire stored at the manufacturing section in advance can be restrained. Furthermore, a monochromatic electric wire is manufactured at the manufacturing section so that a number of kinds of electric wires (color) stored at the manufacturing section in advance can be restrained.

At the manufacturing section, a monochromatic electric wire is manufactured in a required length, and at the coloring/cutting section, the monochromatic electric wire is colored on the outer surface and cut in respectively requested lengths, and delivered to the orderer. Therefore, amount of an electric wire stored temporarily between the manufacturing section and the coloring/cutting section can be restrained. The monochromatic electric wire may be colored in one color and cut in the requested length or may be colored in multi colors and cut in requested lengths for respective colors.

The system of manufacturing electric wires by ordering, mentioned above, is characterized that the electric wire being manufactured in required length after receiving an order of an electric wire is colorless.

According to above system, an electric wire manufactured after receiving an order of an electric wire is colorless. Therefore, the colorless electric wire can be colored securely in the requested color whenever it is necessary.

The system of manufacturing electric wires by ordering, mentioned above, is further characterized that, when receiving an order of an electric wire from an orderer, the order-receiving section outputs a first datum of confirmation informing a delivery date and a price of the electric wire toward the orderer.

According to the above system, after receiving an order of an electric wire, the order-receiving section outputs the first datum of confirmation informing the delivery date and the price of the electric wire toward the orderer. Therefore, the orderer can confirm the delivery date and the cost of electric wires being ordered.

The system of manufacturing electric wires by ordering, mentioned above, is further characterized that, when the first datum of amount of electric wires is received from the order-receiving section, the manufacturing section outputs a second datum of confirmation, informing a date possible to convey amount of the electric wire corresponding to the first datum of amount of electric wires to the coloring/cutting section, toward both of the order-receiving section and the coloring/cutting section.

According to the above system, the manufacturing section outputs the second datum of confirmation, informing the date possible to convey a monochromatic or colorless electric wire, toward both of the order-receiving section and the coloring/cutting section. Therefore, status of process for manufacturing electric wires can be checked at the order-receiving section. Furthermore, at the coloring/cutting section, the date when a monochromatic or colorless electric wire is conveyed can be confirmed.

The system of manufacturing electric wires by ordering, mentioned above, is further characterized that, when the second datum of amount of electric wires is received from the order-receiving section and the second datum of confirmation is received from the manufacturing section, the coloring/cutting section outputs a third datum of confirmation, informing a date possible to deliver the electric wire colored and cut correspondingly to the second datum of amount of electric wires to the orderer, toward the order-receiving section.

According to the above system, the coloring/cutting section outputs the third datum of confirmation, informing the date possible to deliver the electric wire colored and cut correspondingly to the second datum of amount of electric wires to the orderer, toward the order-receiving section. Therefore, status of process for manufacturing electric wires can be checked securely at the order-receiving section.

The above and other objects and features of this invention will become more apparent from the following description taken in conjunction with the accompanying drawings.

DESCRIPTION OF THE PREFERRED EMBODIMENT

A system of manufacturing electric wires by ordering according to a first embodiment of this invention will now be described with reference to FIGS. 1-6. A system 1 of manufacturing electric wires by ordering (shown in FIG. 1) according to a first embodiment of this invention is a system for manufacturing an electric wire 3 shown in FIG. 6.

Figure 6:
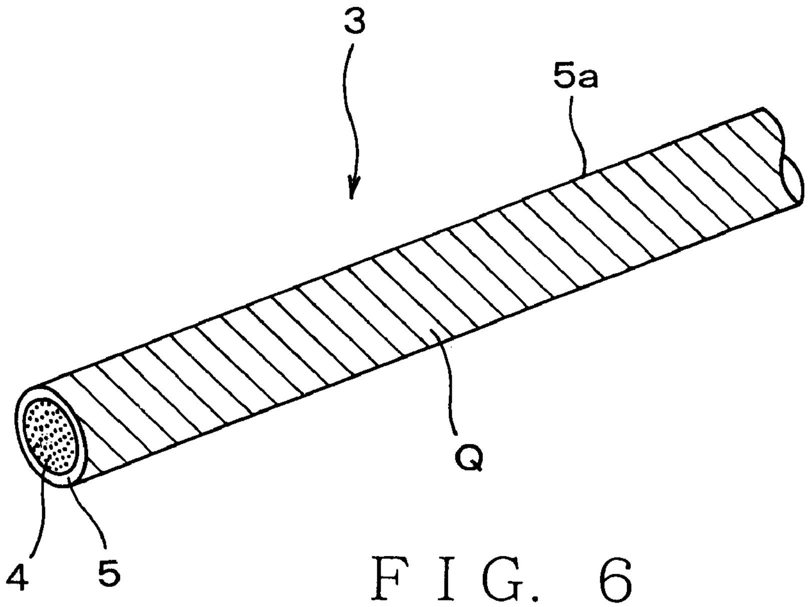
FIG. 6 is a perspective view of an electric wire manufactured by the system of manufacturing electric wires by ordering in FIG. 1.

The electric wire 3 structures a wire harness being wired in a machine such as a car. The electric wire 3, as shown in FIG. 6, is provided with an electrical conductive core wire 4 and an insulating covering 5. The core wire 4 is formed with stranded conductors. The conductor forming the core wire 4 is made of an electrical conductive metal. The core wire 4 may be formed with one conductor.

The covering 5 is made of synthetic resin such as polyvinylchloride (PVC). The covering 5 covers the core wire 4. Outer surface 5*a* of the covering 5 is colored in the requested color Q. The outer surface 5*a* corresponds to outer surface of the electric wire 3 mentioned above.

The plural electric wires 3 are bundled and at least one end thereof may be joined with a connector or the like to form the wire harness mentioned above. The connector is mated with a connector in each of various electronic apparatuses in a car so that the wire harness, i.e. the electric wire 3, transmits various signals or electric power to respective electronic apparatuses.

Figure 1:
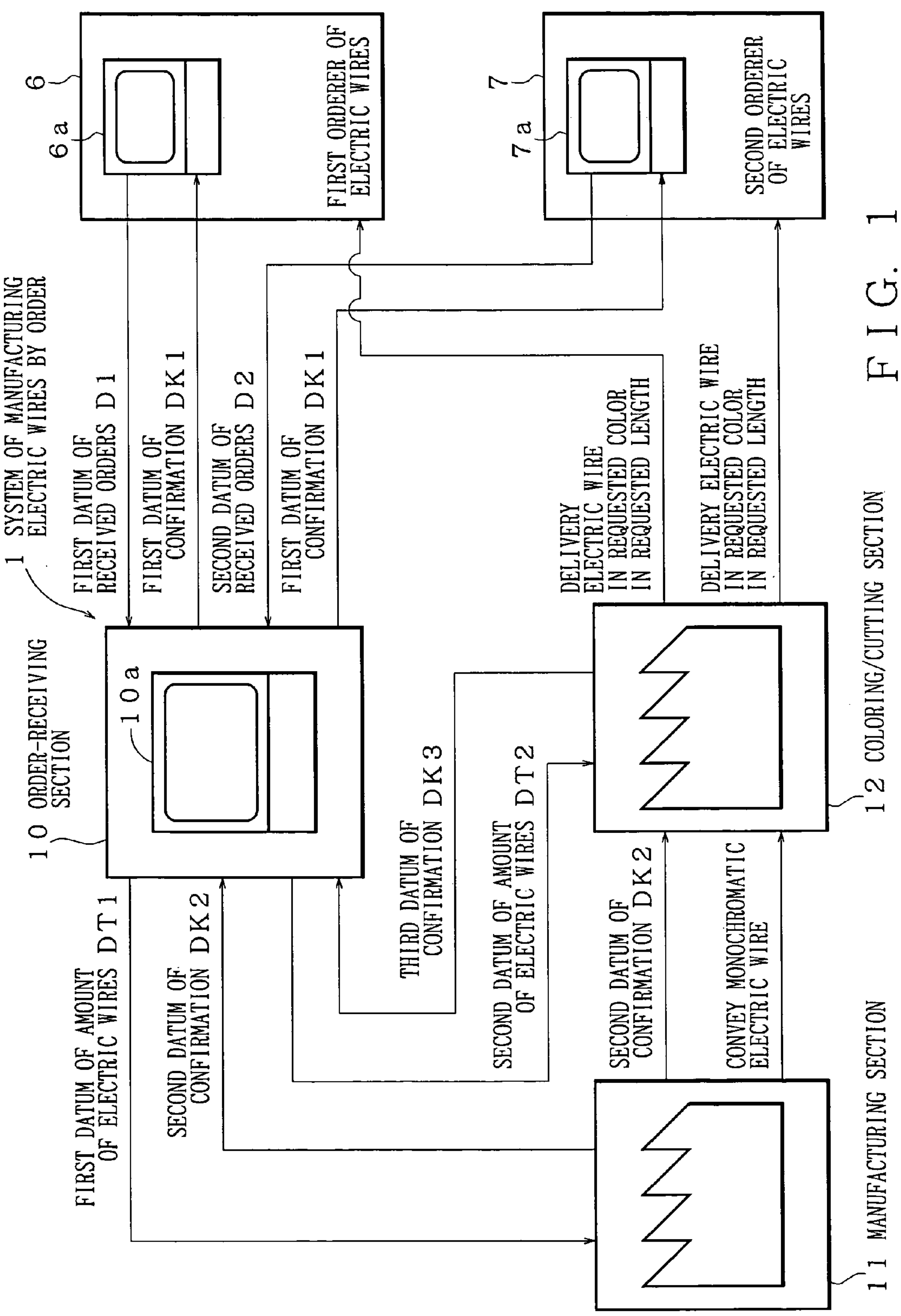
FIG. 1 is a basic block diagram of an embodiment of a system of manufacturing electric wires by ordering according to this invention.

The system 1 of manufacturing electric wires by ordering, as shown in FIG. 1, includes an order-receiving section 10, a manufacturing section 11 and a coloring/cutting section 12. The order-receiving section 10 has a portable computer (call PC hereafter) 10*a* with RAM, ROM and CPU. The PC 10*a* of the order-receiving section 10 is connected with a portable computer (PC) 6*a* at a first orderer of electric wires 6, a portable computer (PC) 7*a* at a second orderer of electric wires 7, the manufacturing section 11 and the coloring/cutting section 12 through a network path. The first orderer of electric wires 6 and the second orderer of electric wires 7 correspond to the orderer mentioned above.

A first datum of received orders D1 corresponding to order amount of the electric wire 3 is inputted from the PC 6*a* at the first orderer of electric wires 6 into the PC 10*a* in the order-receiving section 10. The first datum of received orders D1 contains requested lengths for respective colors of the electric wires 3. A second datum of received orders D2 corresponding to order amount of the electric wire 3 is inputted from the PC 7*a* at the second orderer of electric wires 7 into the PC 10*a* in the order-receiving section 10. The second datum of received orders D2 contains requested lengths for respective colors of the electric wires 3.

After receiving orders of the electric wires 3 from the first orderer 6 and the second orderer 7, the PC 10*a* in the order-receiving section 10 controls the manufacturing section to manufacture a monochromatic P (shown in FIGS. 4, 5) electric wire 3 in a required length. The PC 10*a* in the order-receiving section 10 controls the coloring/cutting section 12 to color the electric wire 3 having monochromatic P outer surface 5*a* manufactured by the manufacturing section 11 in the requested color Q and to cut the electric wire 3 in the requested length. Thereafter, the PC 10*a* in the order-receiving section 10 controls the coloring/cutting section 12 to deliver the electric wire 3 therefrom to the first orderer 6 and the second orderer 7.

The PC 10*a* in the order-receiving section 10 simultaneously outputs a first datum of confirmation DK1, informing a delivery date and a price of ordered electric wire 3, based on a later-described second datum of confirmation DK2 and a later-described third datum of confirmation DK3 respectively to the first orderer 6 and the second orderer 7.

The second datum of confirmation DK2, informing the date possible to convey the electric wire 3 with a monochromatic P outer surface 5*a* manufactured completely from the manufacturing section 11 to the coloring/cutting section 12, is inputted into the PC 10*a* in the order-receiving section 10. Furthermore, the third datum of confirmation DK3, informing the date possible to deliver the electric wire 3 being colored on the outer surface 5*a* in the requested color Q and cut in the requested length from the coloring/cutting section 12 to the first orderer 6 and the second orderer 7, is inputted into the PC 10*a* in the order-receiving section 10.

The PC 10*a* in the order-receiving section 10 is a control apparatus having a sequence program to supply information required for manufacturing an electric wire 3 (later-described data DT1, DT2) to the manufacturing section 11 and the coloring/cutting section 12, according to order amount from the first orderer 6 and the second orderer 7. Later-described sequence process by the PC 10*a* in the order-receiving section 10 can be done manually, or by an apparatus having mechanical and electrical information.

Figure 2:
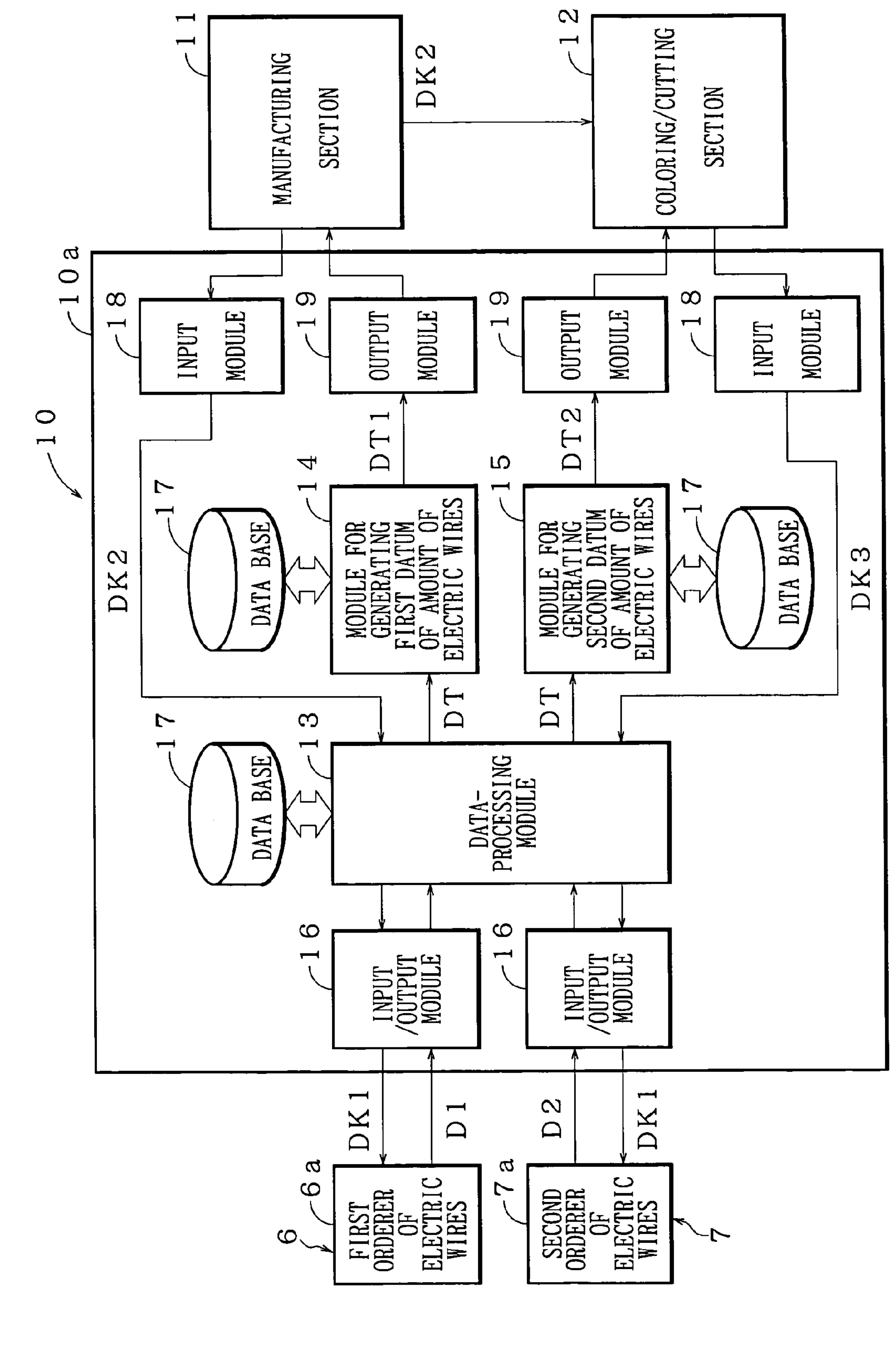
FIG. 2 is a block diagram, showing a basic structure of an order-receiving section in the system of manufacturing electric wires by ordering in FIG. 1.

The PC 10*a* in the order-receiving section 10, as shown in FIG. 2, includes a data-processing module 13, a module for generating the first datum of amount of electric wires 14, and a module for generating the second datum of amount of electric wires 15. The data-processing module 13 is connected through respective input/output modules 16 with the PC 6*a* at the first orderer of electric wires 6 and the PC 7*a* at the second orderer of electric wires 7. The first datum of received orders D1 and the second datum of received orders D2 are inputted into the data-processing module 13.

The data-processing module 13 generates a datum of amount of electric wires DT by means of processing data related with the electric wire 3 by a program stored in a database 17, and calculating colors of outer surfaces and lengths for respective wire sizes (wire diameters) of required electric wires 3 with addition of the first datum of received orders D1 and the second datum of received orders D2. The data-processing module 13 outputs the datum of amount of electric wires DT respectively to the module for generating the first datum of amount of electric wires 14, and the module for generating the second datum of amount of electric wires 15.

Furthermore, the data-processing module 13 is connected through respective input modules 18 with the manufacturing section 11 and the coloring/cutting section 12. The second datum of confirmation DK2 from the manufacturing section 11 and the third datum of confirmation DK3 from the coloring/cutting section 12 are inputted into the data-processing module 13. The data-processing module 13 generates the first datum of confirmation DK1 by means of using the database 17 with the second datum of confirmation DK2 and the third datum of confirmation DK3. The data-processing module 13 outputs the first datum of confirmation DK1 through the input/output module 16 respectively to the first orderer 6 and the second orderer 7.

The module for generating the first datum of amount of electric wires 14 generates a first datum of amount of electric wires DT1 by means of processing data related with the electric wire 3 by a program stored in a database 17, and calculating wire lengths for respective wire sizes (wire diameters) of required electric wires 3 with the datum of amount of electric wires DT. The module for generating the first datum of amount of electric wires 14 outputs the first datum of amount of electric wires DT1 through an output module 19 to the manufacturing section 11. The first datum of amount of electric wires DT1 informs wire lengths for respective wire sizes (wire diameters) of required electric wires 3 corresponding to order amount of the electric wires 3 from the first orderer 6 and the second orderer 7.

The module for generating the second datum of amount of electric wires 15 generates a second datum of amount of electric wires DT2 by means of processing data related with the electric wire 3 by a program stored in a database 17, and calculating colors of outer surfaces 5*a* and wire lengths for respective wire sizes (wire diameters) of required electric wires 3 with the datum of amount of electric wires DT. The module for generating the second datum of amount of electric wires 15 outputs the second datum of amount of electric wires DT2 through the output module 19 to the coloring/cutting section 12. The second datum of amount of electric wires DT2 informs wire lengths for respective colors and respective wire sizes (wire diameters) of required electric wires 3 corresponding to order amount of the electric wires 3 from the first orderer 6 and the second orderer 7.

A factory of electric wires, for example, is used as the manufacturing section 11. When the first datum of amount of electric wires DT1 is inputted, the manufacturing section 11 manufactures electric wires 3 with monochromatic P outer surface 5*a* in required lengths about respective wire sizes by the first datum of amount of electric wires DT1. The outer surface 5*a* of the electric wire 3 with at least same wire size, manufactured by the manufacturing section 11, has the same color. The outer surfaces 5*a* of all electric wires 3 manufactured by the manufacturing section 11 have preferably the same color.

When the first datum of amount of electric wires DT1 is inputted, the manufacturing section 11 generates the second datum of confirmation DK2. The manufacturing section 11 outputs the second datum of confirmation DK2 respectively through the input module 18 to the data-processing module 13 and to the coloring/cutting section 12. The manufacturing section 11 conveys the electric wires 3 manufactured accordingly to the first datum of amount of electric wires DT1 to the coloring/cutting section 12.

The manufacturing section 11 may manufacture colorless electric wires 3 as monochromatic P electric wires. "colorless", mentioned herein, means "of natural color" of synthetic resin, structuring a covering 5 of an electric wire 3, in which various coloring material is not contained so that "colorless" electric wire is one of monochromatic P electric wires.

A distribution center of electric wires 3, for example, can be used as the coloring/cutting section 12. When the second datum of amount of electric wires DT2 is inputted and the monochromatic P electric wire 3 is conveyed from the manufacturing section 11, the coloring/cutting section 12 colors the electric wires 3 respectively in requested color Q and cuts the electric wires 3 respectively in requested lengths for each wire sizes according to the second datum of amount of electric wires DT2. When the first datum of amount of electric wires DT1 is inputted and the second datum of confirmation DK2 from the manufacturing section 11 is inputted, the coloring/cutting section 12 generates the third datum of confirmation DK3. The coloring/cutting section 12 outputs the third datum of confirmation DK3 generated thereby through the input module 18 to the data-processing module 13.

The coloring/cutting section 12 colors the outer surface 5*a* of the covering 5 of the electric wire 3 in color Q different from monochrome P by means of coating the outer surface 5*a* of the covering 5 of the electric wire 3 or dyeing the outer surface 5*a* of the covering 5 of the electric wire 3 with a coloring liquid. Furthermore, the coloring/cutting section 12 cuts the electric wire 3, colored in requested color Q, in requested lengths.

"coloring outer surface 5*a* of the covering 5 of the electric wire 3", mentioned herein, means "coloring outer surface 5*a* of the covering 5 of the electric wire 3 with a coloring material". The coloring material is a liquid material made by dissolving or dispersing a color substance (industrial organic material) in a water or other solvent. Dye or pigment is used as a color substance. The coloring material herein means both a coloring liquid and a color-coating material.

The coloring liquid is made by that dye is dissolved or dispersed in a solvent. The color-coating material is made by that pigment is dispersed in a fluid dispersion. When coloring the outer surface 5*a* of the electric wire 3 with a coloring liquid, the dye penetrates in the covering 5. When coloring the outer surface 5*a* of the electric wire 3 with a color-coating material, the pigment adheres to the outer surface 5*a* without penetrating in the covering 5. Thus, "coloring outer surface of covering" herein means "dyeing outer surface of a covering with a dye partly or throughout" or "coating outer surface of a covering with a color-coating material partly or throughout".

The solvent and the fluid dispersion may have preferably an affinity for synthetic resin of the covering 5 of the electric wire 3. Thereby, a dye can penetrate securely in the covering or a pigment can adhere securely to the outer surface of the covering.

The coloring/cutting section 12 colors the electric wires 3 with monochromatic P outer surface 5*a* in requested colors Q, and cuts the electric wires 3 in requested lengths by using at least one of a first coloring/cutting device 21 shown in FIG. 4 and a second coloring/cutting device 22 shown in FIG. 5. The coloring/cutting section 12 has at least one of a first coloring/cutting device 21 and a second coloring/cutting device 22.

Figure 4A:
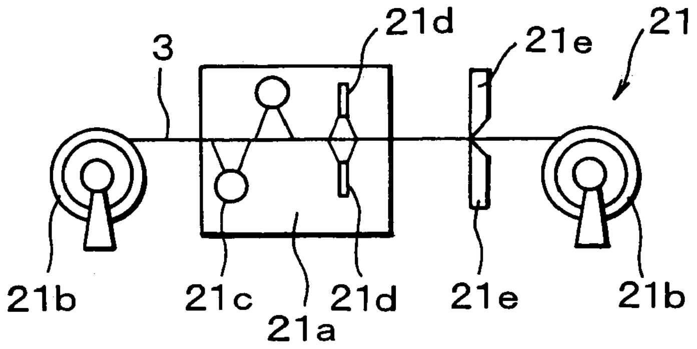
FIG. 4A is a draft, showing the structure of the first coloring/cutting device of the system of manufacturing electric wires by ordering in FIG. 1.

The first coloring/cutting device 21, as shown in FIG. 4A, includes a main body 21*a*, a pair of rollers 21*b*, a plurality of sprayers 21*c*, a dryer 21*d*, and a pair of cutting blades 21*e*. The pair of rollers 21*b* is disposed with a space mutually to move the electric wire 3 along the length thereof between the pair of rollers.

Two sprayers 21*c* are provided in a pair in the figure. The sprayer 21*c* sprays coating material or coloring liquid toward the electric wire 3 moving between the pair of rollers 21*b*. A pair of sprayers 21*c* colors the outer surface 5*a* of the electric wire 3 throughout the electric wire 3 by means of coating with coating material or dyeing with coloring liquid. The pair of sprayers 21*c* colors the outer surface 5*a* in color Q different from monochrome P throughout the electric wire 3.

The dryer 21*d* is provided downstream from the sprayer 21*c* along a moving direction of the electric wire 3. The dryer 21*d* dries up the coating material or the coloring liquid sprayed on the outer surface 5*a* of the electric wire 3 by the sprayer 21*c*.

The pair of cutting blades 21*e* is provided between the pair of rollers 21*b* and downstream from the dryer 21*d* along a moving direction of the electric wire 3. The pair of cutting blades 21*e* cuts the electric wire 3 by means of clamping the electric wire 3 therebetween.

Figure 4B:
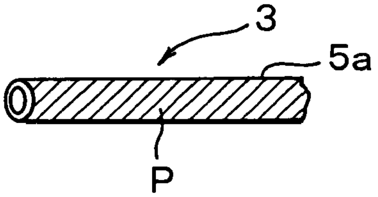
FIG. 4B is a perspective view of an electric wire before being colored by the first coloring/cutting device.
Figure 4C:
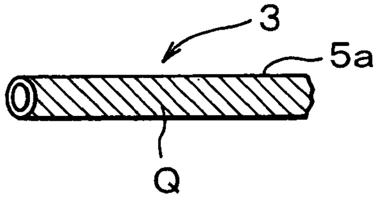
FIG. 4C is a perspective view of the electric wire after being colored by the first coloring/cutting device.

The first coloring/cutting device 21, structured as mentioned above, colors the monochromatic P (shown by parallel slanting lines in the figure) outer surface 5*a* of the electric wire 3, shown in FIG. 4B, in color Q (shown by parallel slanting lines in the figure) throughout as shown in FIG. 4C. Furthermore, the first coloring/cutting device 21 detects the length of the electric wire 3 moving between the pair of rollers 21*b*, for example by number of rotation of the roller 21*b*, and cuts the electric wire 3 in the requested length by mean s of clamping the electric wire 3 between the pair of cutting blades 21*e*.

Figure 5A:
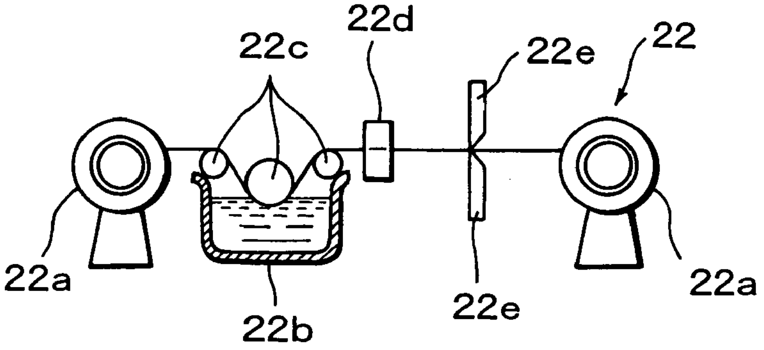
FIG. 5A is a draft, showing the structure of the second coloring/cutting device of the system of manufacturing electric wires by ordering in FIG. 1.

The second coloring/cutting device 22, as shown in FIG. 5A, includes a pair of rollers 22*a*, an impregnating tank 22*b*, a plurality of guide rollers 22*c*, a squeegee 22*d*, and a pair of cutting blades 21*e*. The pair of rollers 22*a* is disposed with a space mutually to move the electric wire 3 along the length thereof between the pair of rollers.

The impregnating tank 22*b* is provided between the pair of rollers 22*a*. The impregnating tank 22*b* is disposed like a box opening upwardly. The impregnating tank 22*b* contains a coloring liquid or a coating material with color Q different from monochrome P. The plurality of guide rollers 22*c* are disposed along a direction of moving the electric wire 3 mutually with a space between the pair of rollers 22*a*. The plurality of guide rollers 22*c* guide the electric wire 3 moving between the pair of rollers 22*a* to be dipped into a coloring liquid or a coating material contained in the impregnating tank 22*b*.

The squeegee 22*d* is disposed between the impregnating tank 22*b* and the roller 22*a*, downstream along a direction of moving the electric wire 3, of the pair of rollers 22*a*. The squeegee 22*d* removes an excess of a coloring liquid or a coating material on the outer surface 5*a* of the electric wire 3.

The pair of cutting blades 22*e* is disposed between the rollers 22*a* and downstream from the squeegee 22*d* along a direction of moving the electric wire 3. The pair of cutting blades 21*e* cuts the electric wire 3 by means of clamping the electric wire 3 therebetween.

Figure 5B:
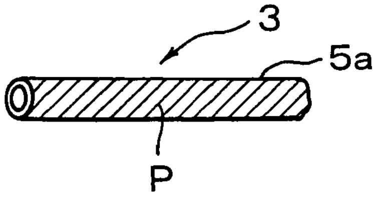
FIG. 5B is a perspective view of an electric wire before being colored by the second coloring/cutting device.
Figure 5C:
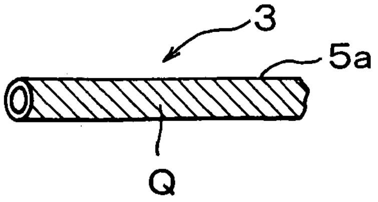
FIG. 5C is a perspective view of an electric wire before being colored by the second coloring/cutting device.

The second coloring/cutting device 22, structured as mentioned above, colors the monochromatic P (shown by parallel slanting lines in the figure) outer surface 5*a* of the electric wire 3, shown in FIG. 5B, in color Q (shown by parallel slanting lines in the figure) throughout as shown in FIG. 5C. Furthermore, the second coloring/cutting device 22 detects the length of the electric wire 3 moving between the pair of rollers 22*a*, for example by number of rotation of the roller 22*a*, and cuts the electric wire 3 in the requested length by means of clamping the electric wire 3 between the pair of cutting blades 22*e*.

Figure 3:
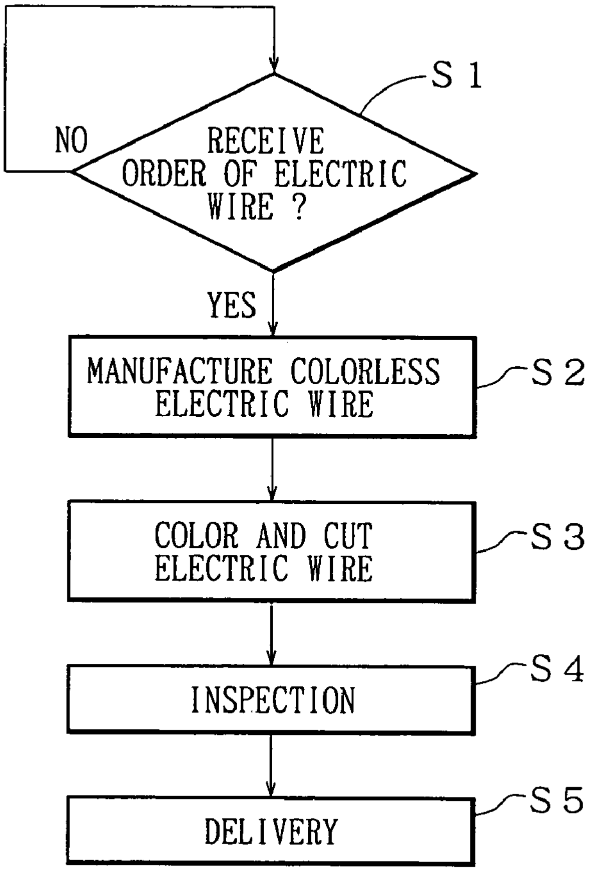
FIG. 3 is a flowchart, showing the steps of process for manufacturing a wire harness by the system of manufacturing electric wires by ordering in FIG. 1.

When manufacturing an electric wire 3 by the system 1 of manufacturing electric wires by ordering, receiving an order of an electric wire 3 or not is judged at Step S1 in FIG. 3. If an order of an electric wire 3 is not received, Step S1 is repeated. When an order of an electric wire 3 is received, process goes to Step S2.

In Step S2, the PC 10*a* in the order-receiving section 10 outputs the first datum of amount of electric wires DT1 to the manufacturing section 11 and the second datum of amount of electric wires DT2 to the coloring/cutting section 12. Thereby, the manufacturing section 11 outputs the second datum of confirmation DK2 both to the PC 10*a* in the order-receiving section 10 and to the coloring/cutting section 12. Thereafter, the coloring/cutting section 12 outputs the third datum of confirmation DK3 to the PC 10*a* in the order-receiving section 10. Then, the manufacturing section 11 manufactures a monochromatic P electric wire 3 in the length corresponding to the first datum of amount of electric wires DT1 and the order-receiving section 10 outputs the first datum of confirmation DK1 to the first orderer of electric wires 6 and the second orderer of electric wires 7. Thereafter, the process goes to Step S3.

In Step S3, the monochromatic P electric wire 3 manufactured by the manufacturing section 11 is conveyed toward the coloring/cutting section 12. The coloring/cutting section 12 colors the outer surface 5*a* in the requested color Q and cuts the electric wire 3 in the requested length according to the second datum of amount of electric wires DT2. Thereafter, the process goes to Step 4. In Step 4, the electric wire 3 is inspected with such as visual check at the coloring/cutting section 12. The process goes to Step 5. In Step 5, the electric wire 3 is delivered to the first-orderer of electric wires 6 and/or the second orderer of electric wires 7.

As an example, the first datum of received orders D1 corresponding to a 25-meter red electric wire 3 and a 13-meter blue electric wire 3 is inputted from the first orderer of electric wires 6. And, the second datum of received orders D2 corresponding to a 50-meter red electric wire 3 and a 300-meter blue electric wire 3 is inputted from the second orderer of electric wires 7. Thereby, the order-receiving section 10 outputs the first datum of amount of electric wires DT1 corresponding to manufacturing a monochromatic P electric wire 3 with a total length of 388 meters, sum of 25, 13, 50 and 300 meters, to the manufacturing section 11. Furthermore, the order-receiving section 10 outputs the second datum of amount of electric wires DT2 corresponding to coloring the 75-meter monochromatic P electric wire 3 in red and the 313-meter monochromatic P electric wire 3 in blue to the coloring/cutting section 12. Furthermore, the order-receiving section 10 outputs the second datum of amount of electric wires DT2 corresponding to cutting the red electric wire 3 in 25 meters and 50 meters red and the blue electric wire 3 in 13 meters and 300 meters to the coloring/cutting section 12.

The manufacturing section 11 manufactures the monochromatic P electric wire 3 of 388 meters according to the first datum of amount of electric wires DT1 and conveys the electric wire 3 to the coloring/cutting section 12. The coloring/cutting section 12 cuts the monochromatic P electric wire 3 in 75 meters and 313 meters according to the second datum of amount of electric wires DT2. Thereafter, the coloring/cutting section 12 colors the 75-meter electric wire 3 in red and the 313-meter electric wire 3 in blue. After that, the coloring/cutting section 12 cuts the red electric wire 3 in 25 meters and 50 meters and the blue electric wire 3 in 13 meters and 300 meters. Then, all electric wires 3 are inspected in a visual check or the like and are conveyed to the first orderer of electric wires 6 and/or the second orderer of electric wires 7.

According to this embodiment, after receiving an order of an electric wire 3, a monochromatic P electric wire 3 is manufactured in a required length. Therefore, amount (length) of the electric wire 3 stored in advance can be restrained. Furthermore, a monochromatic P electric wire 3 is used so that a number of kinds of electric wires (color) stored in advance can be restrained.

A monochromatic P electric wire 3 is manufactured in a required length, and the monochromatic P electric wire 3 is colored on the outer surface 5*a* and cut in the requested length, and delivered to the first orderer of electric wires 6 or the second orderer of electric wires 7. Therefore, storing an electric wire 3 temporarily except between the manufacturing section 11 and the coloring/cutting section 12 is not required. Therefore, amount of the electric wire 3 stored in advance, after receiving an order of an electric wire 3 until delivering the electric wire 3, can be restrained.

Therefore, a room for storing an electric wire 3 in advance can be restrained and also a room for storing an electric wire 3 temporarily during manufacturing can be restrained. Then, cost of the electric wire 3 itself and cost of a product using the electric wire 3 can be restrained. A monochromatic P electric wire 3 is manufactured in a required length and the monochromatic P electric wire 3 is colored on the outer surface 5*a* and cut in the requested length, and delivered to the first orderer of electric wires 6 or the second orderer of electric wires 7. Therefore, an excessive electric wire 3 does not exist after manufacturing the electric wire 3 until delivering the electric wire 3. Then, a useless electric wire 3 is prevented and materials can be saved.

When an electric wire 3 manufactured after receiving an order of the electric wire is colorless the electric wire 3 can be colored securely in the requested color. The monochromatic P electric wire 3 manufactured at the manufacturing section 11 can be colored in one color and cut in requested lengths at the coloring/cutting section 12. Or, a monochromatic P electric wire 3 manufactured at the manufacturing section 11 can be colored in multi colors and cut in requested lengths for respective colors.

After receiving orders from the first orderer of electric wires 6 and/or the second orderer of electric wires 7, the order-receiving section 10 outputs the first datum of confirmation DK1 informing the delivery date and the price of the electric wire 3 toward the first orderer of electric wires 6 and/or the second orderer of electric wires 7. Therefore, the first orderer of electric wires 6 and/or the second orderer of electric wires 7 can confirm the delivery date and the cost of electric wires being ordered.

The manufacturing section 11 outputs the second datum of confirmation DK2 informing the date possible to convey a monochromatic P or colorless electric wire 3 toward both of the order-receiving section 10 and the coloring/cutting section 12. Therefore, status of process for manufacturing electric wires 3 can be checked at the order-receiving section 10, and at the coloring/cutting section 12, the date when a monochromatic P or colorless electric wire 3 is conveyed can be confirmed.

The coloring/cutting section 12 outputs the third datum of confirmation DK3, informing the date possible to deliver the electric wire colored and cut correspondingly to the second datum of amount of electric wires DT2 to the first orderer 6 and the second orderer 7, toward the order-receiving section 10. Therefore, status of process for manufacturing electric wires 3 can be checked securely at the order-receiving section 10.

The embodiment, mentioned above, describes an electric wire 3 structuring a wire harness provided in a car. An electric wire 3 manufactured by the method of manufacturing according to this invention can be used not only in a car but also in a various electronic equipment such as a portable computer or in a various electric machine.

In this invention, as a coloring means for coloring an electric wire 3, dipping, spraying, squirting, printing, transfer printing or other various means can be used. As a coloring liquid or a coloring material, acrylic paint, ink (dye or pigment), UV ink or the like can be used.

In the embodiment mentioned above, following methods of manufacturing electric wires by ordering 3 and systems 1 of manufacturing electric wires by ordering 3 can be provided.

1. A method of manufacturing electric wires by ordering; characterized by receiving an order of an electric wire 3, manufacturing a monochromatic P electric wire 3 in a required length, coloring the outer surface 5*a* of the monochromatic P electric wire 3, cutting the electric wire 3 in requested lengths, and delivering the electric wires 3 to the orderer 6 and the orderer 7 of the electric wire 3.

2. A method of manufacturing electric wires by ordering; characterized by receiving an order of an electric wire 3, manufacturing a monochromatic P electric wire 3 in a required length, coloring the outer surface 5*a* of the monochromatic P electric wire 3 in multi colors, cutting the electric wire 3 in requested lengths for respective colors, and delivering the electric wires 3 to the orderer 6 and the orderer 7 of the electric wire 3.

3. A system 1 of manufacturing electric wires by ordering, comprising the order-receiving section 10 for receiving an order of the electric wire 3, the manufacturing section 11 for manufacturing the electric wire 3, and the coloring/cutting section 12 for coloring the electric wire 3 in the requested color and cutting the electric wire 3 in the requested length; characterized by that the order-receiving section 10 generates the first datum of amount of electric wires DT1 informing a required length of the electric wire 3 corresponding to order amount of the electric wire 3 from the first orderer of electric wires 6 and the second orderer of electric wires 7, and outputs the first datum of amount of electric wires DT1 to the manufacturing section 11, and simultaneously generates the second datum of amount of electric wires DT2 informing required lengths for respective colors of the electric wire 3 corresponding to order amount of the electric wire 3, from the first orderer of electric wires 6 and the second orderer of electric wires 7 and outputs the second datum of amount of electric wires DT2 to the coloring/cutting section 12, and the manufacturing section 11 manufactures a monochromatic P electric wire 3 in amount according to the first datum of amount of electric wires DT1 and conveys the electric wire 3 to the coloring/cutting section 12, and the coloring/cutting section 12 colors and cuts the monochromatic P electric wire 3 according to the second datum of amount of electric wires DT2 and delivers the electric wires 3 to the first orderer of electric wires 6 and the second orderer of electric wires 7.

4. The system 1 of manufacturing electric wires by ordering according to item 3, characterized by that, when receiving an order of the electric wire 3 from the first orderer of electric wires 6 and the second orderer of electric wires 7, the order-receiving section 10 outputs the first datum of confirmation DK1 informing the delivery date and the price of the electric wire 3 to the first orderer of electric wires 6 and the second orderer of electric wires 7.

5. The system 1 of manufacturing electric wires by ordering according to item 3 or 4, characterized by that, when receiving the first datum of amount of electric wires DT1 from the order-receiving section 10, the manufacturing section 11 outputs the second, datum of confirmation DK2, informing the date possible to convey amount of the electric wire 3 corresponding to the first datum of amount of electric wires DT1 to the coloring/cutting section 12, both to the order-receiving section 10 and to the coloring/cutting section 12.

6. The system 1 of manufacturing electric wires by ordering according to item 5, characterized by that, when receiving the second datum of amount of electric wires DT2 from the order-receiving section 10 and the second datum of confirmation DK2 from the manufacturing section 11, the coloring/cutting section 12 outputs the third datum of confirmation DK3, informing the date possible to deliver the electric wire 3 being colored and cut correspondingly to the second datum of amount of electric wires DT2 to the first orderer 6 and the second orderer 7, to the order-receiving section 10.

Although the present invention has been fully described by way of examples with reference to the accompanying drawings, it is to be noted that various change and modifications can be made with the scope of the present invention.

What is claimed is:

1. A method of manufacturing electric wires to order comprising the following steps in the sequence set forth:

receiving by an order-receiving section an order of an electric wire, the order being indicative of amount of electric wires ordered by an orderer;

generating a first datum of amount of electric wires informing a required length of the electric wire according to the amount of the electric wires ordered by the orderer, and generating a second datum of amount of electric wires informing lengths for respective colors of the electric wires according to the amount of the electric wires ordered by the orderer, wherein the first datum of amount of electric wires is generated by the order-receiving section and is output to a manufacturing section and the second datum of amount of electric wires is generated by the order-receiving section and is output to a coloring/cutting section;

manufacturing a monochromatic electric wire in a required length corresponding to the first datum of amount of electric wires, wherein the monochromatic electric wire is manufactured and conveyed by the manufacturing section to the coloring/cutting section;

coloring an outer surface of the monochromatic electric wire in a requested color to produce a colored electric wire and then cutting the colored electric wire in a requested length according to the second datum of amount of electric wires, wherein the monochromatic electric wire is colored and cut by the coloring/cutting section and the requested length is less than the required length; and delivering the colored electric wire by the coloring/cutting section to the orderer of electric wires.

2. The method of manufacturing electric wires by ordering according to claim 1, wherein the electric wire being manufactured in a required length after receiving an order of an electric wire is colorless.

3. A method of manufacturing electric wires to order comprising the following steps in the sequence set forth:

receiving by an order-receiving section an order of an electric wire, the order being indicative of amount of electric wires ordered by an orderer;

generating a first datum of amount of electric wires informing a required length of the electric wire according to the amount of the electric wires ordered by the orderer, and generating a second datum of amount of electric wires informing lengths for respective colors of the electric wires according to the amount of the electric wires ordered by the orderer, wherein the first datum of amount of electric wires is generated by the order-receiving section and is output to a manufacturing section and the second datum of amount of electric wires is generated by the order-receiving section and is output to a coloring/cutting section;

manufacturing a monochromatic electric wire in a required length corresponding to the first datum of amount of electric wires, wherein the monochromatic electric wire is manufactured and conveyed by the manufacturing section to the coloring/cutting section;

coloring an outer surface of the monochromatic electric wire respectively in multi colors to produce a multi-colored electric wire and then cutting the multi-colored electric wire in requested lengths for respective colors of the multi-colored wires according to the second datum of amount of electric wires, wherein the monochromatic electric wire is colored and cut by the coloring/cutting section and the requested lengths are less than the required lengths; and delivering the multi-colored electric wires to the orderer of electric wires.

4. The method of manufacturing electric wires by ordering according to claim 3, wherein the electric wire being manufactured in the required length after receiving an order of an electric wire is colorless.

5. A system of manufacturing electric wires by ordering comprising:

an order-receiving section for receiving orders of electric wires;

a manufacturing section for manufacturing electric wires; and a coloring/cutting section for coloring an outer surface of an electric wire in a requested color and cutting the electric wire in a requested length, wherein the order-receiving section generates a first datum of amount of electric wires informing a required length of the electric wire according to amounts of the electric wires ordered by an orderer and outputs the first datum of amount of electric wires to the manufacturing section, wherein the order-receiving section generates a second datum of amount of electric wires informing lengths for respective colors of the electric wires according to amounts of the electric wires ordered by an orderer and outputs the second datum of amount of electric wires to the coloring/cutting section, wherein the manufacturing section manufactures a monochromatic electric wire in an amount corresponding to the first datum of amount of electric wires and conveys the monochromatic electric wire to the cutting/coloring section, wherein the coloring/cutting section colors the monochromatic electric wire and cuts the colored electric wire according to the second datum of amount of electric wires, and delivers the electric wire to the orderer.

6. A system of manufacturing electric wires by ordering comprising:

an order-receiving section for receiving orders of electric wires;

a manufacturing section for manufacturing electric wires; and a coloring/cutting section for coloring an electric wire in a requested color and cutting the electric wire in a requested length, wherein the order-receiving section generates a first datum of amount of electric wires informing a required length of the electric wire according to amounts of the electric wires ordered by an orderer and outputs the first datum of amount of electric wires to the manufacturing section, wherein the order-receiving section generates a second datum of amount of electric wires informing lengths for respective colors of the electric wires according to amounts of the electric wires ordered by an orderer and outputs the second datum of amount of electric wires to the coloring/cutting section, wherein the manufacturing section manufactures a monochromatic electric wire in an amount corresponding to the first datum of amount of electric wires and conveys the monochromatic electric wire to the cutting/coloring section, wherein the coloring/cutting section colors the monochromatic electric wire and cuts the colored electric wire according to the second datum of amount of electric wires, and delivers the electric wire to the orderer, and wherein, when the order-receiving section receives an order of an electric wire from an orderer, the order-receiving section outputs a first datum of confirmation informing a delivery date and a price of the electric wire toward the orderer.

7. The system of manufacturing electric wires by ordering according to claim 6, wherein the electric wire being manufactured in a required length after receiving an order of an electric wire is colorless.

8. The system of manufacturing electric wires by ordering according to claim 6, wherein, when the manufacturing section receives the first datum of amount of electric wires from the order-receiving section, the manufacturing section outputs a second datum of confirmation, informing a date possible to convey an amount of the electric wire corresponding to the first datum of amount of electric wires to the coloring/cutting section, toward both of the order-receiving section and the coloring/cutting section.

9. The system of manufacturing electric wires by ordering according to claim 8, wherein, when the coloring/cutting section receives the second datum of amount of electric wires from the order-receiving section and the second datum of confirmation from the manufacturing section, the coloring/cutting section outputs a third datum of confirmation, informing a date possible to deliver the electric wire colored and cut correspondingly to the second datum of amount of electric wires to the orderer, toward the order-receiving section.

* * * * *